(12) United States Patent
Ahn et al.

(10) Patent No.: US 10,887,849 B2
(45) Date of Patent: Jan. 5, 2021

(54) METHOD AND DEVICE FOR REPORTING POWER HEADROOM

(71) Applicant: LG Electronics Inc., Seoul (KR)

(72) Inventors: Joonkui Ahn, Seoul (KR); Daesung Hwang, Seoul (KR); Hyunsoo Ko, Seoul (KR); Yunjung Yi, Seoul (KR); Hyunho Lee, Seoul (KR); Seonwook Kim, Seoul (KR); Suckchel Yang, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/318,411

(22) PCT Filed: Aug. 8, 2017

(86) PCT No.: PCT/KR2017/008578
§ 371 (c)(1),
(2) Date: Jan. 17, 2019

(87) PCT Pub. No.: WO2018/030768
PCT Pub. Date: Feb. 15, 2018

(65) Prior Publication Data
US 2019/0239171 A1 Aug. 1, 2019

Related U.S. Application Data

(60) Provisional application No. 62/371,867, filed on Aug. 8, 2016, provisional application No. 62/384,727, filed
(Continued)

(51) Int. Cl.
*H04W 52/36* (2009.01)
*H04W 74/08* (2009.01)
(Continued)

(52) U.S. Cl.
CPC ......... *H04W 52/365* (2013.01); *H04W 52/36* (2013.01); *H04W 72/042* (2013.01);
(Continued)

(58) Field of Classification Search
CPC . H04W 52/36; H04W 52/365; H04W 72/042; H04W 72/0446; H04W 72/12; H04W 74/08
See application file for complete search history.

(56) References Cited

U.S. PATENT DOCUMENTS 8,724,559 B2 * 5/2014 Kim ............... H04L 1/1822
370/329
2010/0297993 A1 * 11/2010 Heo ............... H04L 5/0053
455/423

(Continued)

FOREIGN PATENT DOCUMENTS

KR 1020120048390 5/2012
KR 1020120093893 8/2012
(Continued)

OTHER PUBLICATIONS

R1-167074: 3GPP TSG RAN WG1 Meeting #86, Gothenburg, Sweden, Aug. 22-26, 2016, Nokia, Alcatel-Lucent Shanghai Bell, "On Two-Stage UL scheduling for eLAA," (7 Pages).
(Continued)

*Primary Examiner* — Jenee Holland
(74) *Attorney, Agent, or Firm* — Dentons US LLP (57) ABSTRACT

Provided are a method and a device for reporting a power headroom in a wireless communication system. The device receives initial downlink control information (DCI) for physical uplink shard channel (PUSCH) transmission in a first subframe and receives triggering DCI in a second subframe. The device calculates a power headroom on the assumption that the PUSCH transmission is not performed.

13 Claims, 6 Drawing Sheets

Related U.S. Application Data on Sep. 8, 2016, provisional application No. 62/420,523, filed on Nov. 10, 2016, provisional application No. 62/420,526, filed on Nov. 10, 2016.

(51) Int. Cl.
*H04W 72/12* (2009.01)
*H04W 72/04* (2009.01)
*H04W 52/38* (2009.01)
*H04W 52/14* (2009.01)

(52) U.S. Cl.
CPC ....... *H04W 72/0446* (2013.01); *H04W 72/12* (2013.01); *H04W 74/08* (2013.01)

(56) References Cited

U.S. PATENT DOCUMENTS

| | | | | |
|---|---|---|---|---|
| 2011/0085483 A1* | 4/2011 | Yeon | ................ | H04W 72/0413 370/311 |
| 2011/0105173 A1* | 5/2011 | Haim | ................ | H04W 52/325 455/522 |
| 2011/0110322 A1* | 5/2011 | Koyanagi | ............ | H04L 5/0064 370/329 |
| 2011/0113433 A1* | 5/2011 | Koyanagi | ............ | H04L 5/0039 718/104 |
| 2011/0250918 A1* | 10/2011 | Jen | ................ | H04W 52/08 455/509 |
| 2013/0010720 A1* | 1/2013 | Lohr | ................ | H04L 5/001 370/329 |
| 2013/0051259 A1* | 2/2013 | Kim | ................ | H04W 52/365 370/252 |
| 2013/0083737 A1 | 4/2013 | Earnshaw et al. | | |
| 2013/0121297 A1* | 5/2013 | Kim | ................ | H04L 5/0094 370/329 |
| 2013/0201955 A1* | 8/2013 | Vujcic | ................ | H04L 5/001 370/329 |
| 2014/0029586 A1* | 1/2014 | Loehr | ................ | H04B 3/36 370/336 |
| 2014/0056278 A1* | 2/2014 | Marinier | ............ | H04W 72/044 370/330 |
| 2015/0016317 A1* | 1/2015 | Park | ................ | H04W 52/146 370/280 |
| 2015/0049741 A1* | 2/2015 | Chen | ................ | H04W 56/0005 370/336 |
| 2015/0319717 A1 | 11/2015 | Takaoka et al. | | |
| 2015/0327187 A1* | 11/2015 | Lu | ................ | H04W 52/365 370/329 |
| 2016/0119883 A1* | 4/2016 | Lee | ................ | H04W 52/365 370/329 |
| 2016/0142984 A1* | 5/2016 | Lee | ................ | H04W 72/0413 370/329 |
| 2016/0150487 A1* | 5/2016 | Aiba | ................ | H04W 52/365 370/311 |
| 2016/0157191 A1* | 6/2016 | Yokomakura | ....... | H04W 52/365 370/252 |
| 2016/0174173 A1* | 6/2016 | Lee | ................ | H04J 3/00 370/280 |
| 2016/0192350 A1* | 6/2016 | Yi | ................ | H04L 5/0035 370/329 |
| 2016/0197715 A1* | 7/2016 | Papasakellariou | .... | H04L 5/0053 370/329 |
| 2016/0262183 A1* | 9/2016 | Froberg Olsson | .... | H04W 48/08 |
| 2016/0330725 A1* | 11/2016 | Aiba | ................ | H04L 5/0007 |
| 2018/0352575 A1* | 12/2018 | You | ................ | H04W 72/12 |

FOREIGN PATENT DOCUMENTS

| | | |
|---|---|---|
| WO | 2015032023 A1 | 3/2015 |
| WO | 2015174759 | 11/2015 |

OTHER PUBLICATIONS

R1-166691: 3GPP TSG RAN WG1 Meeting #86, Gothenburg, Sweden Aug. 22-26, 2016, Samsung, "Discussion on two-step UL grant scheduling," (3 Pages).

* cited by examiner

METHOD AND DEVICE FOR REPORTING POWER HEADROOM

CROSS-REFERENCE TO RELATED APPLICATIONS

This application is the National Stage filing under 35 U.S.C. 371 of International Application No. PCT/KR2017/008578, filed on Aug. 8, 2017, which claims the benefit of U.S. Provisional Applications No. 62/371,867 filed on Aug. 8, 2016, No. 62/384,727 filed on Sep. 8, 2016, No. 62/420,523 filed on Nov. 10, 2016, and No. 62/420,526 filed on Nov. 10, 2016, the contents of which are all hereby incorporated by reference herein in their entirety.

BACKGROUND OF THE INVENTION

Field of the Invention

The present invention relates to wireless communication, and more particularly, to a method of reporting a power headroom in a wireless communication system, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

A power headroom is used to provide a base station with information on a difference between maximum transmit power of a device and estimated power for uplink transmission. In an unlicensed band, since CCA is performed before uplink transmission, the uplink transmission cannot be performed if a channel is occupied by another device. There may be a difference between a power headroom to be reported and actual uplink transmission, and this causes an interference between devices.

SUMMARY OF THE INVENTION

The present invention provides a method for reporting a power headroom in an unlicensed band and a device using the method.

In an aspect, a method for reporting a power headroom in a wireless communication system is provided. The method includes receiving, by a wireless device, initial downlink control information (DCI) in a first subframe from a serving cell, wherein the initial DCI includes a uplink (UL) grant and a triggering flag, the UL grant indicating a resource allocation for a physical uplink shared channel (PUSCH), the triggering flag indicating a triggering of a transmission of the PUSCH by triggering DCI, receiving, by the wireless device, the triggering DCI in a second subframe from the serving cell, calculating, by the wireless device, a power headroom for the serving cell, wherein the power headroom is calculated without considering a transmission format of the PUSCH, and reporting, by the wireless device, the calculated power headroom to the serving cell in a third subframe on the PUSCH.

In another aspect, a device for reporting a power headroom in a wireless communication system includes a transceiver configured to transmit and receive a radio signal, and a processor operatively coupled to the transceiver. The processor is configured to instruct the transceiver to receive initial downlink control information (DCI) in a first subframe from a serving cell, wherein the initial DCI includes a uplink (UL) grant and a triggering flag, the UL grant indicating a resource allocation for a physical uplink shared channel (PUSCH), the triggering flag indicating a triggering of a transmission of the PUSCH by triggering DCI, instruct the transceiver to receive the triggering DCI in a second subframe from the serving cell, calculate a power headroom for the serving cell, wherein the power headroom is calculated without considering a transmission format of the PUSCH, and instruct the transceiver to report the calculated power headroom to the serving cell in a third subframe on the PUSCH.

In still another aspect, a method for reporting a power headroom in a wireless communication system is provided. The method includes receiving, by a wireless device, a first uplink (UL) grant in a first serving cell, the first UL grant including a resource allocation of a first physical uplink shared channel (PUSCH) for reporting a power headroom, receiving, by the wireless device, initial downlink control information (DCI) in a second serving cell, the initial DCI including a second UL grant and a triggering flag, the second UL grant indicating a resource allocation for a second PUSCH, the triggering flag indicating a triggering of a transmission of the second PUSCH by triggering DCI, calculating, by the wireless device, a first power headroom for the first serving cell and a second power headroom for the second serving cell, and transmitting, by the wireless device, the first and second power headrooms on the first PUSCH in a subframe n, If the triggering DCI is not received in a subframe n-q or before then, the second power headroom is calculated by assuming that the second PUSCH is not transmitted, where n is a natural number and q is a natural number satisfying q>=1.

It is possible to reduce interference caused by uplink transmission between devices.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
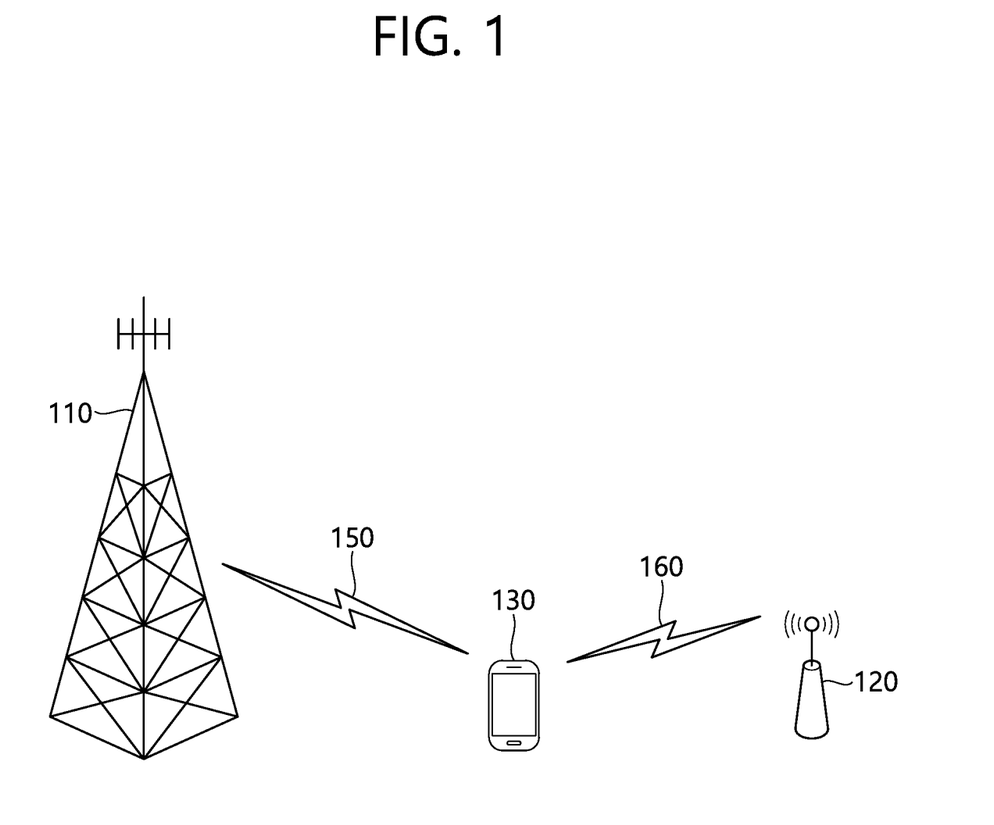
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

A cell operating in an unlicensed band is called an unlicensed cell or a licensed-assisted access (LAA) cell, and a cell operating in a licensed band is called a licensed cell. For clarity, it is assumed that the licensed cell is a primary cell, and the unlicensed cell is a secondary cell.

Now, a power headroom report (PHR) in 3GPP LTE will be described.

In 3GPP LTE, DL/UL scheduling is achieved in a unit of subframe. A subframe includes a plurality of orthogonal frequency division multiplexing (OFDM) symbols, and a time required to transmit one subframe is called a transmission time interval (TTI). 1TTI may be 1 ms. In 3GPP LTE, 1 subframe includes 14 OFDM symbols in a normal cyclic prefix (CP), and 1 subframe includes 12 OFDM symbols in an extended CP.

In 3GPP LTE, a DL physical channel may include a physical downlink control channel (PDCCH), a physical control format indicator channel (PCFICH), a physical hybrid-ARQ indicator channel (PHICH), and a physical downlink shared channel (PDSCH). A UL physical channel may include a physical uplink control channel (PUCCH) and a physical uplink shared channel (PUSCH). Control information transmitted through the PDCCH is called downlink control information (DCI). The DCI may include PDSCH resource allocation (also referred to as a downlink (DL) grant) or PUSCH resource allocation (also referred to as an uplink (UL) grant).

The PHR is used to provide a BS with information on a difference between maximum transmit power of a wireless device and estimated power for UL transmission. The wireless device calculates a power headroom for each configured cell, and reports it through MAC signaling or RRC signaling to the BS periodically or when a specific event is satisfied. A PHR reported by the wireless device in any cell in any subframe may include a power headroom for all cells configured to the wireless device.

Figure 2:
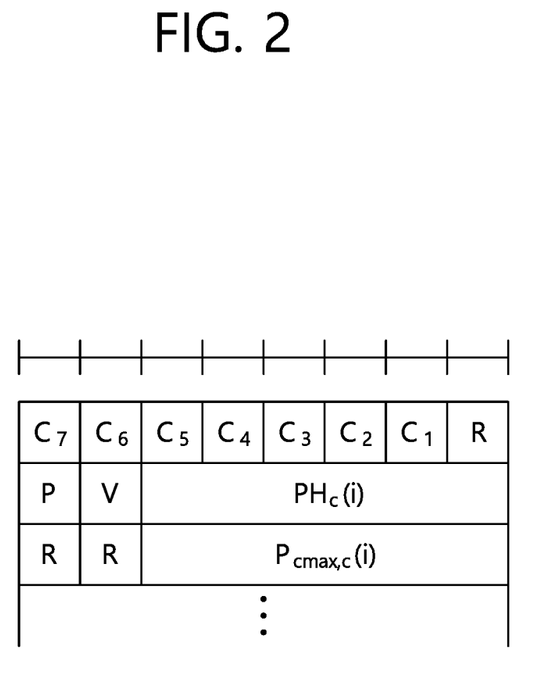
FIG. 2 shows an example of a media access control (MAC) control element (CE) used in a power headroom report (PHR).

FIG. 2 shows an example of a MAC control element (CE) used in a PHR.

Cr indicates whether there is a power headroom of an r-th cell. If a Cr field is '1', it indicates that there is a PH field of a cell having an index r. A V field indicates whether it is an actual power headroom or a virtual power headroom. A PHc(i) field indicates a power headroom in a subframe i of a serving cell c. Pcmax,c(i) indicates maximum transmit power of a corresponding cell used in calculation of the power headroom. The number of fields and a size thereof are for exemplary purposes only.

Pcmax,c(i) is calculated as maximum power that can be transmitted in a corresponding cell in a situation where the wireless device satisfies a restriction requirement for a transmission spectrum by considering all transmissions in the corresponding cell or other cells in a corresponding subframe.

The actual power headroom is calculated based on power required when the wireless device transmits a corresponding signal at an actual transmission time point in any cell. The actual power headroom is calculated by considering scheduling information such as a bandwidth, a transmission format, a code rate, a modulation scheme, or the like used to transmit a corresponding signal. The virtual power headroom is calculated based on required power if a signal is transmitted at a time when the signal is not actually transmitted. The virtual power headroom is calculated by assuming a virtual signal format.

For example, when the wireless device transmits a PUSCH without a PUCCH in a subframe i of a serving cell c, the actual power headroom may be calculated as follows.

$$PH_c(i)=P_{cmax,c}(i)-\{10 \log_{10}(M_{PUSCH,c}(i))+P_{O\_PUSCH,c}(j)+\alpha_c(j)PL_c+\Delta_{TF,c}(i)+f_c(i)\}$$ [Equation 1]

Herein, Pcmax,c(I) denotes transmit power configured in a subframe i of a serving cell c, and $M_{PUSCH,c}(i)$ denotes a bandwidth allocated to PUSCH transmission. $P_{O\_PUSCH,c}(j)$, $\alpha_c(j)$, $\Delta_{TF,c}(i)$, and $f_c(i)$ denote parameters. $PL_c$ denotes an estimated DL path loss calculated by the wireless device.

The virtual power headroom may be calculated as follows.

$$PH_c(i)=P'_{cmax,c}(i)-\{P_{O\_PUSCH,c}(1)+\alpha_c(1)PL_c+f_c(i)\}$$ [Equation 2]

Herein, P'cmax,c(i) denotes transmit power calculated by assuming a specific level in a subframe i of a serving cell c. $P_{O\_PUSCH,c}(1)$, $\alpha_c(1)$, and $f_c(i)$ are parameters.

Figure 3:
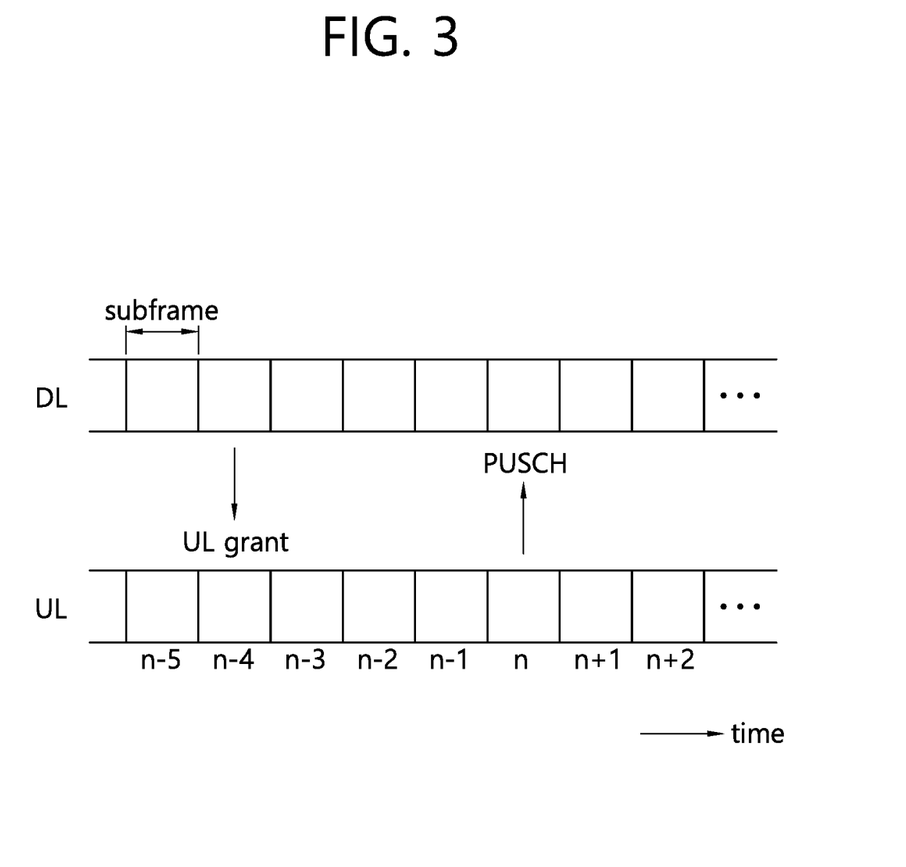
FIG. 3 shows uplink (UL) transmission in 3rd generation partnership project (3GPP) according to the conventional technique.

FIG. 3 shows UL transmission in 3GPP according to the conventional technique.

A wireless device receives a UL grant on a PDCCH in a subframe n-k. The wireless device transmits a PUSCH based on the UL grant on a subframe n. In frequency division duplex (FDD), k=4. Since a length of 1 subframe is 1 ms, a processing time of at least 4 ms is ensured from reception of the UL grant to PUSCH transmission.

In an unlicensed band, LBT must be first performed in order for the wireless device to have access to a wireless channel. If the wireless channel is busy as a result of performing the LBT in the subframe n, the wireless device defers or abandon PUSCH transmission. That is, if another node occupies the wireless channel between the subframe n-k and the subframe n, UL scheduling of a BS may be meaningless. A possibility that another node occupies the wireless channel may decrease when a value k decreases, but there is a problem in that capability of the wireless device must be further increased. 2-stage UL scheduling is proposed to decrease a time difference between the UL scheduling of the BS and actual UL transmission.

Figure 4:
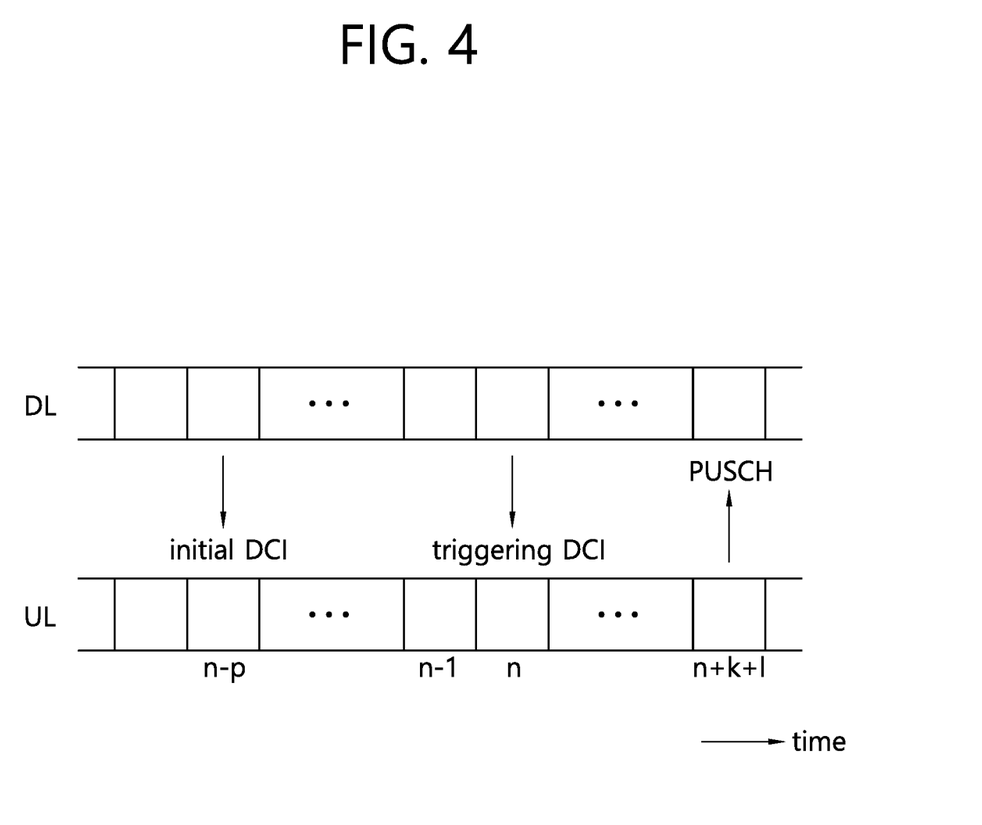
FIG. 4 shows an example of proposed 2-stage UL scheduling.

FIG. 4 shows an example of proposed 2-stage UL scheduling. This is an example of UL transmission in an LAA cell.

A wireless device receives initial DCI on a first PDCCH in a subframe n-p. l, p, and v are natural numbers satisfying l⇐p⇐v. The first PDCCH may be subjected to cyclic redundancy check (CRC) masking based on a cell-radio network temporary identifier (C-RNTI) of the wireless device. The initial DCI includes a UL grant for PUSCH transmission. In addition, the initial DCI may indicate whether a PUSCH will be transmitted without triggering DCI (this is called 'non-triggered scheduling') or the PUSCH will be transmitted after receiving the triggering DCI (this is called 'triggering scheduling').

Table 1 shows information included in initial DCI. Not all fields are not essential, and a field name is for exemplary purposes only.

TABLE 1

| Field name | Description |
| --- | --- |
| UL grant | Resource allocation information for PUSCH transmission |
| Scheduling flag | It indicates non-triggering scheduling or triggering scheduling |
| Timing offset | Timing offset for PUSCH transmission. It is indicated by k. |
| Triggering time window | Offset for transmitting triggering DCI. It is indicated by v. When a triggering flag indicates triggering scheduling, this field may be valid. |
| Scheduled subframe | The number of consecutive subframes in which PUSCH is transmitted. |
| CSI (channel state information indicator) request | Triggering of aperiodic CSI reporting |

If initial DCI indicates triggering scheduling, the wireless device receives triggering DCI on a second PDCCH in the subframe n. The triggering DCI may include information on a triggering flag and a triggering offset. The triggering flag indicates triggering of PUSCH transmission. The triggering offset indicates the value l. Upon receiving the initial DCI and the triggering DCI, the wireless device may know when the PUSCH will be transmitted on the basis of the timing offset k of the initial DCI and the triggering offset l of the triggering offset. The wireless device may receive the triggering DCI in the subframe n, and may transmit the PUSCH in the subframe n+k+l.

If the initial DCI indicates non-triggering scheduling, the wireless device receives the initial DCI in the subframe n, and transmits the PUSCH in the subframe n+k+l. In case of the non-triggering scheduling, l may be 4.

Upon receiving the initial DCI, the wireless device prepares a transport block for PUSCH transmission according to a UL grant. In addition, upon receiving the triggering DCI, the PUSCH may be transmitted within a time shorter than 4 ms.

Now, a PHR is described when 2-stage UL scheduling is performed.

The wireless device cannot know when the PUSCH will be transmitted until the triggering DCI is received after the initial DCI is received. Therefore, if a time of transmitting the PUSCH after the triggering DCI is received is significantly short, a time of calculating a power headroom included together in PUSCH transmission may be insufficient.

Figure 5:
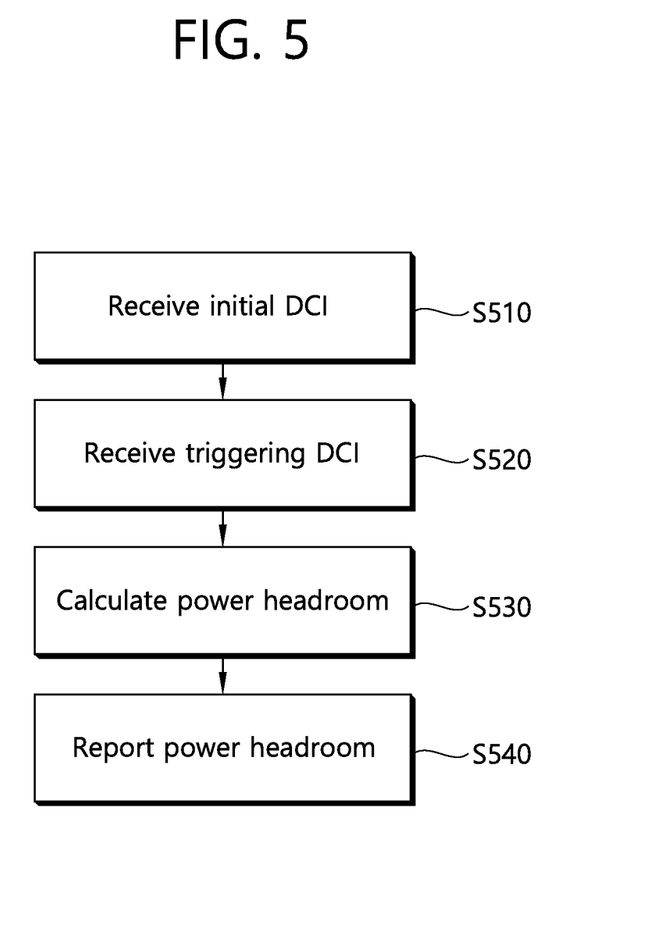
FIG. 5 shows a PHR according to an embodiment of the present invention.

FIG. 5 shows a PHR according to an embodiment of the present invention.

In an unlicensed cell, a wireless device receives initial DCI for PUSCH transmission on a first PDCCH (S510). The wireless device receives triggering DCI on a second PDCCH (S520). The wireless device calculates a power headroom for the unlicensed cell (S530). The wireless device reports the power headroom (S540).

Now, a method of calculating a power headroom for an unlicensed cell subjected to 2-stage UL scheduling is proposed.

In a first embodiment, a power headroom for a serving cell subjected to 2-stage UL scheduling may be excluded in a PHR. This is because a time for calculating a power headroom of a corresponding cell may be insufficient after receiving triggering DCI.

In a second embodiment, a power headroom for a serving cell subjected to 2-stage UL scheduling may always be included in a PHR. Even if triggering DCI is not received, an actual power headroom may be calculated by assuming corresponding PUSCH transmission for a cell which has received initial DCI. Alternatively, if the triggering DCI is not received, a virtual power headroom may be calculated for the cell which has received the initial DCI.

If the triggering DCI is received after a specific time, the virtual power headroom may be calculated, and if it is received before the specific time, the actual power headroom may be calculated. When the power headroom is reported on a PUSCH in a subframe n, if the triggering DCI is received in a subframe n-q or before then, the actual power headroom may be calculated by considering corresponding PUSCH transmission. If the triggering DCI is received after the subframe n-q, the virtual power headroom is calculated without considering corresponding PUSCH transmission. A value q may be predetermined or may be given by initial DCI or RRC signaling. For example, q=4.

For example, the wireless device receives the initial DCI in which a triggering flag indicates triggering scheduling in a subframe n-p of an unlicensed cell. The wireless device receives triggering DCI in a subframe n of the unlicensed cell. The wireless device transmits a power headroom of the unlicensed cell on a PUSCH in a subframe n+k+l of the unlicensed cell. If (k+l)>=q, the power headroom of the unlicensed cell is an actual power headroom. If (k+l)<q, the power headroom of the unlicensed cell is a virtual power headroom.

For another example, it is assumed that the wireless device receives a UL grant indicating a first PUSCH in a subframe n-4 of a first serving cell (licensed cell or unlicensed cell). The first PUSCH is used in PHR transmission. When the first serving cell is an unlicensed cell, a UL grant for the first PUSCH may be included in DCI in which a triggering flag indicates non-triggering scheduling. The wireless device receives initial DCI for a second PUSCH in a second serving cell (unlicensed cell). If triggering DCI is not received in a subframe n-q of the second serving cell or before then, a virtual power headroom not considering transmission of the second PUSCH is calculated as a power headroom of the second serving cell. When the triggering DCI is received in the subframe n-q of the second serving cell or before then, an actual power headroom considering transmission of the second PUSCH is calculated as the power headroom of the second serving cell. The PHR including the power headroom of the first and second serving cells is transmitted on the first PUSCH of the first serving cell.

In a third embodiment, for 2-stage UL scheduled serving cell, a power headroom may always be calculated and reported without consideration of scheduled PUSCH transmission. This is because there may not be enough time to calculate the power headroom until the PUSCH is transmitted after the triggering DCI is received.

For example, the wireless device receives the initial DCI in which a triggering flag indicates triggering scheduling in a subframe n-p of an unlicensed cell. The wireless device receives triggering DCI in a subframe n of the unlicensed cell. The wireless device transmits a power headroom of the unlicensed cell on a PUSCH in a subframe n+k+l of the unlicensed cell. The power headroom of the unlicensed cell is a virtual power headroom calculated without consideration of the PUSCH transmission.

In a fourth embodiment, for a serving cell subjected to 2-stage UL scheduling, the wireless device may randomly select and calculate any one of an actual power headroom and a virtual power headroom.

Now, aperiodic CSI reporting is described.

As shown in Table 1, a CSI request for requesting CSI reporting may be included in initial DCI. If the CSI request is included, a wireless device reports CSI on a PUSCH after receiving triggering DCI. The wireless device cannot know a specific subframe at which the PUSCH will be transmitted until the triggering DCI is received after receiving initial DCI. Therefore, similarly to a power headroom, there is an issue to be considered as to which time will be a criterion for calculating the CSI.

In a first embodiment, the wireless device may determine a subframe in which the CSI will be calculated based on a subframe in which the initial DCI is received. It is assumed that the CSI is measured in a subframe $n-n_{CSI}$. The subframe $n-n_{CSI}$ may correspond to a value DL subframe no later than a subframe in which initial DCI is received. The value $n_{CSI}$ may satisfy $n_{CSI}>=p$.

In a second embodiment, even if the CSI request is included in the initial DCI, the wireless device may not report the CSI or may report predetermined information (e.g., out of range). When the triggering DCI is received in a subframe n and the PUSCH is transmitted in a subframe n+k+l, if (k+l) is less than a specific value, the wireless device may not report the CSI or may report the predetermined information. The specific value may be 2, 3, or 4.

The wireless device may inform a BS of PHR capability and/or CSI reporting capability on the basis of a time difference of triggering DCI reception and PUSCH transmission.

It is difficult for the wireless device to predict the time difference between DCI (initial DCI and/or triggering DCI) reception and PUSCH transmission. Therefore, when a transmit power control (TPC) command is included in the DCI, there is an issue as to when to apply the TPC command to UL transmission. In an embodiment, the TCP command may be applied from a subframe in which DCI is received to a subframe Y. Y may be fixed (e.g., Y=4) by considering a processing time of the wireless device, or may vary depending on capability of the wireless device, or may be included in the DCI. In another embodiment, the TCP command may be applied from PUSCH transmission. If a UL grant having a new TPC command is given between DCI reception and PUSCH transmission, a value obtained by accumulating two TPCs may be applied to subsequent PUSCH transmission or may be applied to both of two PUSCH transmissions.

In the 2-stage UL scheduling, PUSCH transmission is triggered through two pieces of DCI. Therefore, a possibility that incorrect PUSCH triggering occurs may be higher than 1-stage UL scheduling. For example, this is a case where a triggering flag in initial DCI indicates triggering scheduling, but the wireless device detects this as non-triggering scheduling. In order to prevent the wireless device from incorrect detection, a predefined bit may be included in the initial DCI and/or the triggering DCI. If the predefined bit is correct, the wireless device may determine that the received DCI is correct. Alternatively, a CRC size of the initial DCI may be different from a CRC size of the triggering DCI. For example, the CRC size of the initial DCI may be greater than the CRC size of the triggering DCI.

Hereinafter, a scheme of supporting positioning according to various CE levels in a mobile communication system supporting coverage enhancement (CE) is proposed.

A machine type communication (MTC) application or an Internet of Things (IoT) application requires a mechanical characteristic such as low cost and low power. In addition thereto, since a plurality of devices are disposed to a specific region, a coverage issue is important. This is because the plurality of devices disposed inside a building may undergo a serious path loss or penetration loss. Ever since the release 13, 3rd generation partnership project (3GPP) long term evolution (LTE) has supported coverage enhancement (CE) to support devices which undergo a great path loss. In order to support coverage enhancement of up to at least 15 dB, it is being introduced that a downlink channel and an uplink channel are transmitted repeatedly across a plurality of subframes or a plurality of frequency units.

A positioning reference signal (PRS) defined in 3GPP LTE is a signal measured for positioning of a wireless device. A pseudo-random quadrature phase shift keying (QPSK) sequence which is disposed with an interval of 6 resource elements (REs), which is frequency-shifted according to a cell ID, and of which a seed is determined according to the cell ID is used in one OFDM symbol. A PRS is transmitted in an OFDM symbol excluding an OFDM symbol in which a PDCCH and a cell-specific reference signal (CRS) are transmitted in a subframe. The PRS is transmitted in consecutive N subframes. Herein, N=1, 2, 4, 6. A transmission period of the PRS may be 160, 320, 640, and 1280 subframes. A transmission bandwidth of the PRS may be 1.4 MHz, 3 MHz, 5 MHz, 10 MHz, 15 MHZ, or 20 MHz. When assuming a transmission period of 160 ms, the PRS may be transmitted in consecutive 6 subframes through a PRS bandwidth of 1.4 MHz.

Meanwhile, when the wireless device measures a reference signal timing difference (RSTD) for positioning by using a DL signal or PRS received from each neighboring cell, if different cells apply different CE levels, positioning performance may deteriorate due to a difference of estimation accuracy between cells. A method is proposed in which the wireless device measures and reports the PRS in a network supporting various CE levels.

The PRS is a DL signal measured for positioning by the wireless device. A repetition count in a time domain of the PRS, a repetition count (an occupied band) in a frequency domain of the PRS, or a combination thereof is called a CE level. Reception signal power obtained by measuring the PRS is called reference signal reception power (RSRP), and associated information required in positioning such as reference signal time difference (RSTD) or the like reported to a network is called positioning measurement information.

In a first embodiment, the wireless device may report positioning measurement information only for a cell in which RSRP is greater than or equal to a specific level according to a CE level. The wireless device receives information on the CE level of each cell. The positioning measurement information may be reported only for a cell in which RSRP is greater than or equal to a threshold according to the CE level of each cell. The serving cell may report to the wireless device an RSRP threshold depending on each CE level or CE level range.

In a second embodiment, the wireless device may report positioning measurement information only for a cell in which a CE level is greater than or equal to a threshold according to an RSRP range. The wireless device receives information on the CE level of each cell from a serving cell. The wireless device reports the positioning measurement information only for a cell in which a CE level is greater than or equal to a threshold according to a range of RSRP measured in a corresponding cell. The serving cell may inform the wireless device of a threshold of a CE level depending on each RSRP range.

In a third embodiment, the wireless device may report positioning measurement information by combining measurement values obtained from a plurality of PRSs. The wireless device combines measurement values obtained in a plurality of PRS units (e.g., a plurality of subframes). The number of PRS units to be combined may be determined according to RSRP, or may be determined such that a combined PRS SINR value is greater than or equal to a threshold. A serving cell may inform the wireless device of information on the minimum number of PRS units to be combined according to the RSRP and/or the threshold of the PRS SINR value.

In a fourth embodiment, the wireless device may report positioning measurement information only for a cell in which the combined PRS SINR is greater than or equal to the threshold. The wireless device may obtain the positioning measurement information by combining the plurality of PRS units. The wireless device may report the positioning measurement information only for a cell in which the combined PRS SINR is greater than or equal to the threshold. The serving cell may inform the wireless device of the PRS SINR threshold which is a criterion for reporting the positioning measurement information.

In a fifth embodiment, a positioning scheme may be configured according to a CE level required for the wireless device. It may be not desirable in terms of a system overhead to repeatedly transmit a PRS during many subframes in order to support a great CE level by a BS performing DL transmission only with some limited bands as in NB-IoT transmission. Accordingly, a positioning scheme (e.g., observed time difference of arrival (OTDOA)) based on PRS measurement may be applied to a wireless device requiring less than a specific CE level, and a positioning scheme (e.g., uplink=time difference of arrival (UTDOA)) based on a UL transmission transmitted by the wireless device may be applied to a wireless device requiring more than a specific CE level. Specifically, a positioning scheme based on a UL signal may be applied to a wireless device configured with an upper CE level out of a plurality of CE levels supported by the BS.

In a sixth embodiment, the wireless device may report a cell (or cell group) in which a positioning measurement can be reported. It may be difficult to perform reliable positioning measurement in a cell (or carrier) allocated according to a coverage level of the wireless device. The wireless device may report a cell which does not satisfy PRS measurement quality or may report the cell which satisfies the PRS measurement quality. In addition, RS measurement quality expected in each cell may be reported together. The PRS measurement quality may include a CE level, RSRP, SINR, etc. A network may inform the wireless device of a threshold of the PRS measurement quality.

In the aforementioned first to sixth embodiments, information provided by the serving cell to the wireless device may be delivered by a location server not via the serving cell but directly to the wireless device. Alternatively, the information may be delivered by the location server via the serving cell to which the wireless device has access.

Figure 6:
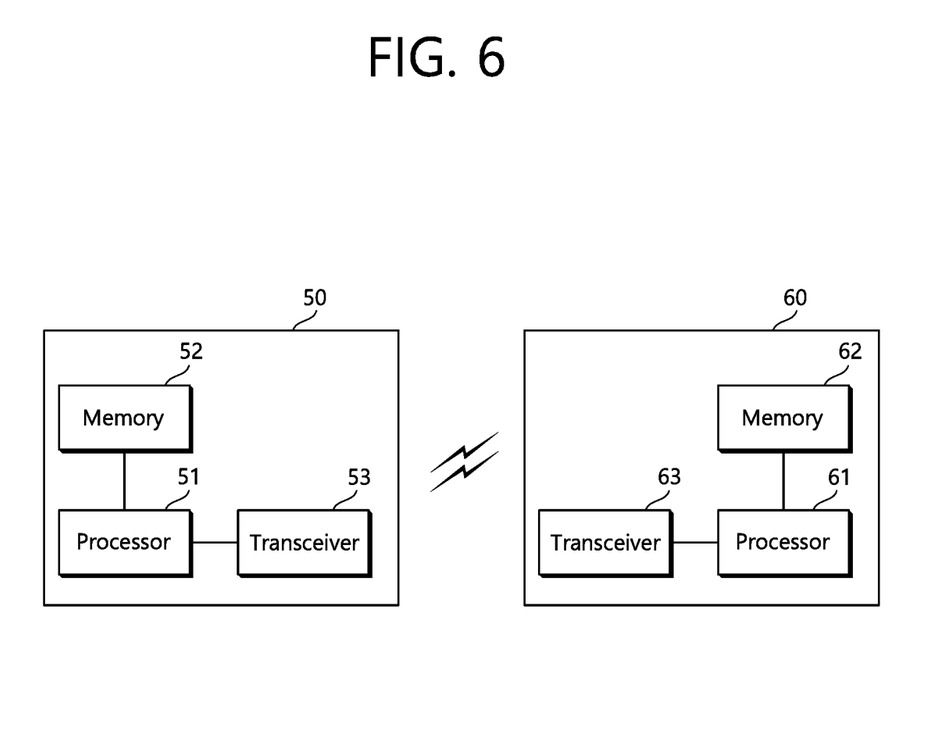
FIG. 6 is a block diagram showing a wireless communication system according to an embodiment of the present invention.

FIG. 6 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a power headroom in a wireless communication system, the method performed by a wireless device and comprising:

receiving initial downlink control information (DCI) in a first subframe on a Licensed-Assisted Access (LAA) cell, the initial DCI including an uplink (UL) grant for scheduling a transmission of a physical uplink shared channel (PUSCH), the initial DCI indicating a triggering of the transmission of the PUSCH by a triggering DCI;

receiving, by the wireless device, the triggering DCI in a second subframe on the LAA cell; and transmitting the PUSCH based on the UL grant in a third subframe on the LAA cell, the PUSCH including a power headroom, wherein the initial DCI further includes a timing offset, the triggering DCI includes a triggering offset, and the third subframe in which the PUSCH is transmitted is determined based on the timing offset and the triggering offset, and wherein the power headroom is computed based on predefined parameters which are not obtained from the UL grant.

2. The method of claim 1, wherein the LAA cell is a secondary cell to be activated by a primary cell.

3. The method of claim 1, wherein the second subframe is a subframe n, and the third subframe is a subframe n+k+l, where n is a natural number, k is a value from the timing offset and l is a value obtained from the triggering offset.

4. The method of claim 1, wherein the initial DCI further includes information on the number of consecutive subframes in which the PUSCH is transmitted.

5. A device for reporting a power headroom in a wireless communication system, the device comprising:
a transceiver configured to transmit and receive a radio signal; and
a processor operatively coupled to the transceiver and configured to:
instruct the transceiver to receive initial downlink control information (DCI) in a first subframe on a Licensed-Assisted Access (LAA) cell, the initial DCI including an uplink (UL) grant for scheduling a transmission of a physical uplink shared channel (PUSCH), the initial DCI indicating a triggering of the transmission of the PUSCH by a triggering DCI;
instruct the transceiver to receive the triggering DCI in a second subframe on the LAA cell; and
instruct the transceiver to transmit the PUSCH based on the UL grant in a third subframe on the LAA cell, the PUSCH including a power headroom,
wherein the initial DCI further includes a timing offset, the triggering DCI includes a triggering offset, and the third subframe in which the PUSCH is transmitted is determined based on the timing offset and the triggering offset, and
wherein the power headroom is computed based on predefined parameters which are not obtained from the UL grant.

6. The device of claim 5, wherein the second subframe is a subframe n, and the third subframe is expressed by a subframe n+k+l, where n is a natural number, k is a value from the timing offset and l is a value obtained from the triggering offset.

7. The device of claim 5, wherein the initial DCI further includes information on the number of consecutive subframes in which the PUSCH is transmitted.

8. A method for reporting a power headroom in a wireless communication system, the method comprising:
receiving, by a wireless device, a first uplink (UL) grant in a first serving cell, the first UL grant scheduling a transmission of a first physical uplink shared channel (PUSCH) for reporting a power headroom;
receiving, by the wireless device, initial downlink control information (DCI) in a second serving cell, the initial DCI including a second UL grant for scheduling a transmission of a second PUSCH, the initial DCI indicating a triggering of the transmission of the second PUSCH by a triggering DCI;
computing, by the wireless device, a first power headroom for the first serving cell and a second power headroom for the second serving cell; and
transmitting, by the wireless device, the first and second power headrooms on the first PUSCH in a subframe n,
wherein the triggering DCI is not received in a subframe n-q or or a subframe earlier than subframe n-q, and the second power headroom is calculated by computed based on the second PUSCH not being transmitted, where n is a natural number and q is a natural number satisfying q≥1.

9. The method of claim 8, wherein q=4.

10. The method of claim 8, wherein the second serving cell is a Licensed-Assisted Access (LAA) cell.

11. A device for reporting a power headroom in a wireless communication system, the device comprising:
a transceiver configured to transmit and receive a radio signal; and
a processor operatively coupled to the transceiver and configured to:
instruct the transceiver to receive a first uplink (UL) grant in a first serving cell, the first UL grant scheduling a transmission of a first physical uplink shared channel (PUSCH) for reporting a power headroom;
instruct the transceiver to receive initial downlink control information (DCI) in a second serving cell, the initial DCI including a second UL grant for scheduling a transmission of a second PUSCH, the initial DCI indicating a triggering of the transmission of the second PUSCH by a triggering DCI;
compute a first power headroom for the first serving cell and a second power headroom for the second serving cell; and
instruct the transceiver to transmit the first and second power headrooms on the first PUSCH in a subframe n,
wherein the triggering DCI is not received in a subframe n-q or a subframe earlier than subframe n-q, and the second power headroom is computed by based on the second PUSCH not being transmitted, where n is a natural number and q is a natural number satisfying q≥1.

12. The device of claim 11, wherein q=4.

13. The device of claim 11, wherein the second serving cell is a Licensed-Assisted Access (LAA) cell.

* * * * *